United States Patent
Tachibana et al.

(10) Patent No.: US 9,134,495 B2
(45) Date of Patent: Sep. 15, 2015

(54) OPTICAL FIBER

(71) Applicant: SUMITOMO ELECTRIC INDUSTRIES, LTD., Osaka-shi, Osaka (JP)

(72) Inventors: Kumiko Tachibana, Yokohama (JP); Takashi Fujii, Yokohama (JP); Takashi Takada, Yokohama (JP); Noriaki Iwaguchi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 13/913,969

(22) Filed: Jun. 10, 2013

(65) Prior Publication Data

US 2013/0330051 A1 Dec. 12, 2013

(30) Foreign Application Priority Data

Jun. 11, 2012 (JP) .................... 2012-132061

(51) Int. Cl.
 *G02B 6/02* (2006.01)
 *G02B 6/44* (2006.01)
 *G02B 6/00* (2006.01)

(52) U.S. Cl.
 CPC ............... *G02B 6/4403* (2013.01); *G02B 6/00* (2013.01); *G02B 6/02395* (2013.01); *G02B 6/4494* (2013.01)

(58) Field of Classification Search
 CPC .................................................. G02B 6/02395
 USPC .................................................. 385/128, 144
 See application file for complete search history.

(56) References Cited

U.S. PATENT DOCUMENTS

| | | | | |
|---|---|---|---|---|
| 2002/0168163 | A1* | 11/2002 | Szum et al. | 385/128 |
| 2003/0049446 | A1* | 3/2003 | Schissel et al. | 428/375 |
| 2011/0117353 | A1* | 5/2011 | Henshaw et al. | 428/221 |

FOREIGN PATENT DOCUMENTS

| | | |
|---|---|---|
| CN | 1056093 A1 | 11/1991 |
| CN | 1248961 A1 | 3/2000 |
| JP | 2009-149794 A | 7/2009 |
| JP | A-2013-501705 | 1/2013 |
| WO | WO 9115434 A1 | 10/1991 |
| WO | WO 9821157 A1 | 5/1998 |
| WO | WO-2009/082221 A1 | 7/2009 |
| WO | WO 2011019885 A1 | 2/2011 |
| WO | WO 2011/081519 | 7/2011 |

* cited by examiner

*Primary Examiner* — Ryan Lepisto

(74) *Attorney, Agent, or Firm* — Drinker Biddle & Reath LLP

(57) ABSTRACT

A coated glass fiber 1 comprising a glass fiber 10 and a resin coating layer containing an inner layer 20 and an outer layer 30 provided on the outer circumference of the glass fiber 10, wherein the resin constituting the inner layer 20 is formed by curing a urethane-based ultraviolet curable resin composition containing a surfactant in an amount of 0.1 to 1.0% by weight and Young's modulus thereof is from 0.3 to 10 MPa. The coated optical fiber has a good water immersion resistance.

11 Claims, 3 Drawing Sheets

OPTICAL FIBER

This application claims priority from Japanese Patent Application No. 2012-132061, filed on Jun. 11, 2012, the entire contents of which are hereby incorporated by reference.

FIELD OF THE INVENTION

The present invention relates to a coated optical fiber comprising a glass fiber and a resin coating layer provided on the outer circumference of the glass fiber. More specifically, it relates to a coated optical fiber, wherein the inner layer is formed of a urethane-based ultraviolet curable resin composition having a specific composition.

A coated optical fiber is obtained by heating and melting in glass rod, drawing a glass fiber from the glass rod, and coating the glass fiber with a resin for the purpose of protection and reinforcement. As a structure of the resin coating, there is, for example, known a structure containing a soft inner layer provided on the glass fiber surface and highly rigid outer layer having high Young's modulus provided outside the inner layer.

Incidentally, from the viewpoints of light transmission performance, durability, and workability at laying, various properties are required for the coated optical fiber. As one of them, there may be mentioned hot-water immersion resistance that is used as an index of weather resistance. For example, in a coated optical fiber inferior in weather resistance, transmission loss is generated when it is immersed in hot water at about 60° C.

A coated optical fiber having an good hot-water immersion resistance is disclosed in JP-A-2009-149794. The coated optical fiber is obtained by employing a resin composition using a dialkylamine having a specific structure in addition to a urethane(meth)acrylate having a structure derived from a polyether polyol and an ethylenic unsaturated group-containing compound.

At the time of laying an optical fiber, from the viewpoint of workability, there is sometimes used an optical fiber ribbon in which a plurality of coated optical fibers have been aligned and coated with a resin material (ribbon material) beforehand. In order to expose a glass fiber thereof, the laying operation includes a step of simultaneously removing the ribbon material and the resin coating layer of the coated optical fiber. Therefore, an efficient strippability of the resin coating layer of the coated optical fiber together with the ribbon material is also one property required for the coated optical fiber.

However, although the coated optical fiber disclosed in JP-A-2009-149794 has an improved hot-water immersion resistance, the ribbon strippability that relates to workability at laying of the optical fiber has not been investigated.

Moreover, as a mechanism of generation of the transmission loss during the immersion in hot water, it is considered that air bubbles form in the inner layer as temperature elevates and a micro-bending or lateral pressure are applied to the part. However, since measures to cope with the air bubbles are not clearly taken in the method of Patent Document 1, there is a concern of a decrease in water immersion resistance in a more severe situation.

SUMMARY OF INVENTION

The present invention is devised in view of the above problems in conventional coated optical fibers and an object of the invention is to provide a coated optical fiber having a good water immersion resistance.

As a result of extensive studies for achieving the above object, the present inventors have found that, when a certain amount of a surfactant is incorporated into a resin composition constituting the inner layer, the air bubbles generated in the inner layer with the elevation of temperature can be finely dispersed by the action and also the strippability of the resin coating layer can be improved. Thus, they have accomplished the invention.

Namely, the coated optical fiber of the invention is a coated glass fiber comprising a glass fiber and a resin cover layer containing an inner layer and an outer layer provided on the outer circumference of the glass fiber, wherein the resin constituting the inner layer is formed by curing a urethane-based ultraviolet curable resin composition containing a surfactant in an amount of 0.1 to 1.0% by weight and Young's modulus thereof is from 0.3 to 10 MPa.

Moreover, it is also possible to form an optical fiber ribbon by disposing a plurality of the coated optical fibers of the invention in parallel and coating the periphery thereof with a ribbon material.

According to the present invention, it is possible to provide a coated optical fiber having a good water immersion resistance and exhibiting a good ribbon strippability when used in an optical fiber ribbon.

DETAILED DESCRIPTION OF EXEMPLARY EMBODIMENT

1. Coated Optical Fiber

Figure 1:
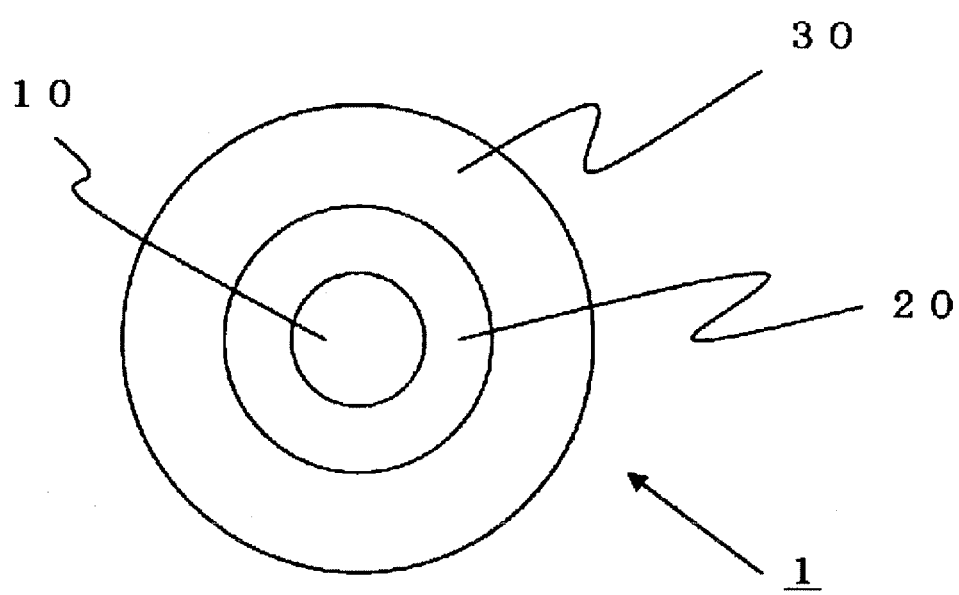
FIG. 1 is a schematic cross-sectional view showing one example of the coated optical fiber of the invention.

The following will describe the coated optical fiber of the invention in detail with reference to FIG. 1.

FIG. 1 is a schematic cross-sectional view showing one example of the coated optical fiber of the invention.

A coated optical fiber 1 has an inner layer 20 formed by curing a urethane-based ultraviolet curable resin composition on the outer circumference of the glass fiber 10 and an outer layer formed by curing a curable resin on the outer circumference thereof. A resin coating layer is formed of the inner layer 20 and the outer layer 30. The layer structure of the resin coating layer is not limited to the two-layer structure as long as the layer has the inner layer and the outer layer and may be a multilayer structure such as a three-layer structure or a four-layer structure, which has other layer(s) between the inner layer and the outer layer or outside the outer layer. Moreover, for example, an ink layer may be provided on the outer circumference of the outer layer 30. The thickness of the ink layer is usually several μm. Such an ink layer is usually formed of an ultraviolet curable resin composition as in the case of the outer layer 30.

The glass fiber 10 usually has a clad layer composed of quartz glass on the outer circumference of a core layer composed of a quartz-based glass. The outer diameter of the core layer may be, for example, from 7 μm to 60 μm and the diameter including the core layer and the clad layer may be, for example, 125 μm.

The inner layer 20 is a cured resin layer formed on the outer circumference of the glass fiber 10 and the thickness thereof may be, for example, from 10 μm to 50 μm.

The inner layer is formed by curing a urethane-based ultraviolet curable resin composition and the urethane-based ultraviolet curable resin composition contains a surfactant in an amount of 0.1 to 1.0% by weight, desirably 0.5 to 1.0% by weight.

When the composition contains a surfactant in an amount of 0.1 to 1.0% by weight, air bubbles generated in the inner layer at the immersion in hot water can be finely dispersed without influencing the physical properties of the inner layer and friction force acting between the glass fiver and the resin coating layer can be appropriately reduced, so that an increase in transmission loss at the immersion in water is suppressed and also simultaneous coating strippability at laying operation becomes satisfactory.

Figure 3:
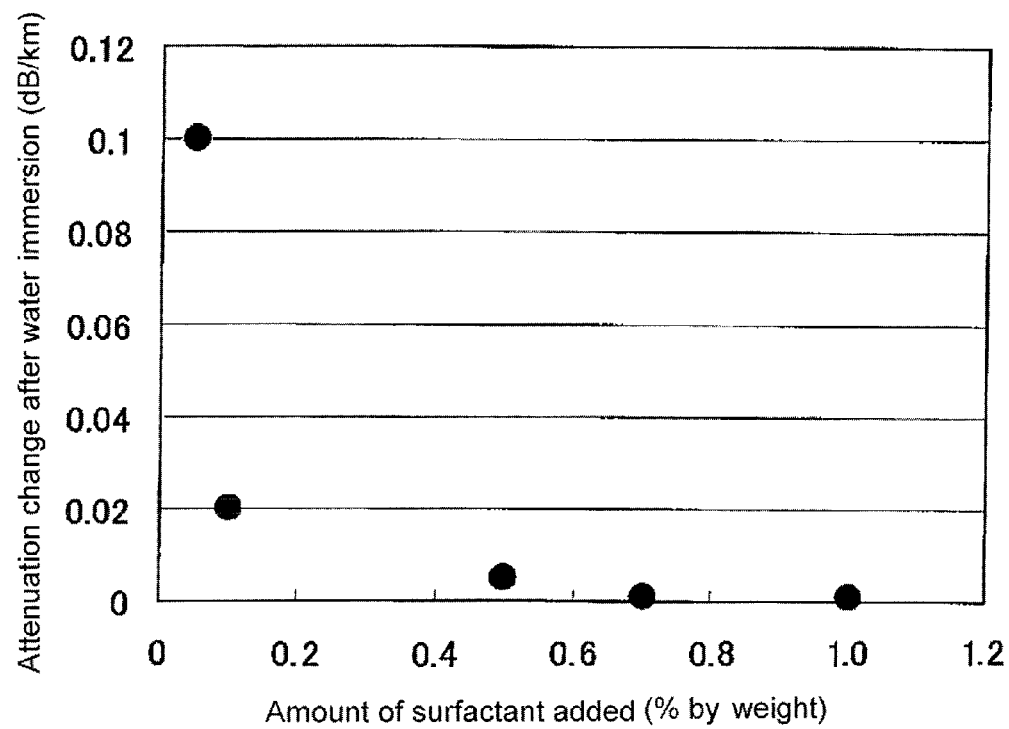
FIG. 3 is a graph showing a relationship between the amount of a surfactant added and an attenuation change after water immersion.

FIG. 3 is a graph showing a relationship between the amount of a surfactant added and an attenuation change after water immersion. Here, the attenuation change after water immersion is a value of transmission loss at a wavelength of 1.55 μm increased when a coated optical fiber has been immersed in hot water at 60° C. for 30 days. As is apparent also from FIG. 3, in the case where a surfactant is contained in an amount of 0.1% or more by weight based on the total amount of the urethane-based ultraviolet curable resin composition, an increase in transmission loss at the immersion in hot water can be dramatically suppressed as compared with the case where the surfactant is contained in an amount of 0.05% by weight (leftmost point). Also, in the case where the surfactant is contained in an amount of 0.5% or more by weight, an increase in transmission loss at the immersion in hot water can be almost zero and it is more preferable. In this regard, when the surfactant is contained in an amount exceeding 1.0% by weight, it is not beneficial since the suppressing effect on the transmission loss is saturated and a risk of exfoliation of the resin may increase.

The Young's modulus of the resin constituting the inner layer is from 0.3 to 10 MPa. When the Young's modulus is less than 0.3 MPa, the strength required for the coated optical fiber becomes insufficient and, when it exceeds 10 MPa, it becomes difficult to buffer outer force. By controlling the Young's modulus to from 0.3 to 10 MPa, the transmission loss can be reduced while a certain strength required for a coated optical fiber is maintained. Here, the certain strength means such strength that the coating layer is not destroyed in the case where the optical fiber is bent or lateral pressure is applied.

In the invention, the Young's modulus of the resin after curing is measured in a film state by the method according to Japanese Industrial Standards K 7161-1994.

The following will describe the ingredients contained in the urethane-based ultraviolet curable resin composition constituting the inner layer.

The urethane-based ultraviolet curable resin composition before curing preferably contains a usually used urethane oligomer, a reactive diluent, a photo radical initiator, and an antioxidant, and a surfactant that is an essential ingredient is contained in an amount of 0.1 to 1.0% by weight. Curing of the resin composition is performed by polymerization of the urethane oligomer itself or by polymerization of the urethane oligomer and the reactive diluent that is a reactive monomer.

As the surfactant, any of anionic, cationic and nonionic ones may be used but a fatty acid ester-type nonionic surfactant is preferred, and a glycerin fatty acid ester, a sorbitan fatty acid ester, a polyoxyethylene sorbitan fatty acid ester, and a polyoxysorbitol fatty acid ester are particularly preferred. These surfactants may be used singly or two or more thereof may be used in combination.

The following will describe suitable examples of the ingredients other than the surfactant.

(1) Urethane Oligomer

The urethane oligomer can be obtained by reacting an aliphatic polyether-based polyol, an organic polyisocyanate, a hydroxyl group-containing (meth)acrylate, and the like. The molecular weight is preferably from about 5,000 to 30,000. The urethane oligomer is preferably contained in an amount of 60 to 80% by weight in the urethane-based ultraviolet curable resin composition. When it is contained in such a ratio, the hardness of the inner layer can be controlled within a preferable range.

Examples of the aliphatic polyether-based polyol include polyethylene glycol, polypropylene glycol, polytetramethylene glycol, polyhexamethylene glycol, polyheptamethylene glycol, polydecamethylene glycol, and polyether diols obtained by ring-opening copolymerization of two or more ionically polymerizable cyclic compounds.

Examples of the ionically polymerizable cyclic compounds include cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcylcohexene oxide, phenyl glycidyl ether, butyl glycidyl ether, and benzoic acid glycidyl ester.

Specific examples of the polyether diols obtained by ring-opening copolymerization of two or more ionically polymerizable cyclic compounds include binary copolymers obtained from combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, and the like; and a ternary copolymer obtained from a combination of tetrahydrofuran, butene-1-oxide and ethylene oxide.

These aliphatic polyether-based polyols may be used singly or two or more thereof may be used in combination.

As the organic polyisocyanate, an aromatic diisocyanate, an alicyclic diisocyanate, an aliphatic diisocyanate, and the like may be mentioned.

Examples of the aromatic diisocyanate include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanatoethyl) fumarate, 6-isopropyl-1,3-phenylene diisocyanate, 4-diphenylpropane diisocyanate, and tetramethylxylylene diisocyanate.

Example of the alicyclic diisocyanate include isophorone diisocyanate, methylenebis(4-cyclohenyl isocyanate), hydrogenated diphenylmethane diisocyanate, hydrogenated xylylene diisocyanate, 2,5-bis(isocyanatomethyl)-bicyclo [2.2.1]heptane, and 2,6-bis(isocyanatomethyl)-bicyclo [2.2.1]heptane.

Examples of the aliphatic diisocyanate include 1,6-hexane diisocyanate, 2,2,4-trimethylhexamethylene diisocyanate, and lysine diisocyanate.

Of these, in view of obtaining compositions of economical and stable quality, aromatic diisocyanates are more preferred and 2,4-tolylene diisocyanate and 2,6-tolylene diisocyanate are particularly preferred. These organic polyisocyanates may be used singly or two or more thereof may be used in combination.

As the hydroxyl group-containing (meth)acrylate, it is preferred to use a hydroxyl group-containing (meth)acrylate in which the hydroxyl group is bonded to a primary carbon atom (hereinafter also referred to as a "primary hydroxyl group-containing (meth)acrylate") and a hydroxyl group-containing (meth)acrylate in which the hydroxyl group is bonded to a secondary carbon atom (hereinafter also referred to as a "secondary hydroxyl group-containing (meth)acrylate"). A hydroxyl group-containing (meth)acrylate in which the hydroxyl group is bonded to a tertiary carbon atom (hereinafter also referred to as a "tertiary hydroxyl group-containing (meth)acrylate") is not preferred since it is inferior in reactivity with an isocyanate group.

Examples of the primary hydroxyl group-containing (meth)acrylate include 2-hydroxyethyl(meth)acrylate, 3-hydroxypropyl(meth)acrylate, 4-hydroxybutyl(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, and trimethylolethane di(meth)acrylate.

Examples of the secondary hydroxyl group-containing (meth)acrylate include 2-hydroxypropyl(meth)acrylate, 2-hydroxybutyl(meth)acrylate, 2-hydroxy-3-phenyloxypropyl(meth)acrylate, and 4-hydroxycyclohexyl(meth)acrylate. In addition, compounds obtained by the addition reaction of glycidyl group-containing compounds such as an alkyl glycidyl ether, an allyl glycidyl ether, and a glycidyl(meth)acrylate with (meth)acrylic acid are also mentioned.

(2) Reactive Diluent

The reactive diluent is a reactive monomer and is preferably contained in an amount of 20 to 40% by weight in the urethane-based ultraviolet curable resin composition. When the reactive diluent is contained, the application of the resin on the glass fiber is facilitated.

The reactive diluent is not particularly limited but a compound having one ethylenic unsaturated group and a compound having two or more ethylenic unsaturated groups are mentioned.

Specific examples of the compound having one ethylenic unsaturated group include vinyl group-containing lactams such as N-vinylpyrrolidone and N-vinylcaprolactam, alicyclic structure-containing (meth)acrylates such as isobornyl (meth)acrylate, bornyl(meth)acrylate, tricyclodecanyl(meth) acrylate, dicyclopentanyl(meth)acrylate, dicyclopentenyl (meth)acrylate, and cyclohexyl(meth)acrylate, benzyl(meth) acrylate, 4-butylcyclohexyl(meth)acrylate, acryloylmorpholine, vinylimidazole, and vinylpyridine. Furthermore, 2-hydroxyethyl(meth)acrylate, 2-hydroxypropyl (meth)acrylate, 4-hydroxybutyl(meth)acrylate, stearyl(meth) acrylate, isostearyl(meth)acrylate, tetrahydrofurfuryl(meth) acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, methoxypolypropylene glycol(meth)acrylate, diacetone(meth)acrylamide, isobutoxymethyl(meth)acrylamide, N,N-dimethyl(meth)acrylamide, t-octyl(meth)acrylamide, dimethylaminoethyl(meth) acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, hydroxybutyl vinyl ether, lauryl vinyl ether, cetyl vinyl ether, 2-ethylhexyl vinyl ether, vinyloxyethoxyethyl(meth)acrylate, and vinyloxyethyl(meth)acrylate.

Specific examples of the compound having two or more ethylenic unsaturated groups include trimethylolpropane tri (meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl) isocyanurate tri(meth) acrylate, tris(2-hydroxyethyl) isocyanurate di(meth)acrylate, a di(meth)acrylate of a diol of an ethylene oxide or propylene oxide adduct of bisphenol A, a di(meth)acrylate of a diol of an ethylene oxide or propylene oxide adduct of hydrogenated bisphenol A, an epoxy(meth)acrylate in which a (meth)acrylate is added to glycidyl ether of bisphenol A, and triethylene glycol divinyl ether.

(3) Photo Radical Initiator

The photo radical initiator is preferably contained in an amount of 0.1 to 5% by weight in the urethane-based ultraviolet curable resin composition.

The photo radical initiator is not particularly limited but examples thereof include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, and bis-(2,6-dimethoxybenzoyl)-2,4,4-trimethylpentylphosphine oxide.

The outer layer 30 is preferably a layer composed of a cured resin having a relatively large Young's modulus. It is formed of, for example, a urethane acrylate-based ultraviolet curable resin on the outer circumference of the inner layer 20 and the thickness may be from 10 μm to 50 μm. By providing such a layer, it becomes easy to protect the glass fiber from impact from the outside. The Young's modulus of the outer layer 30 is preferably from 500 MPa to 1,800 MPa. By controlling it to the range, embrittlement of the coated optical fiber is prevented, and necessary elongation is easily maintained.

2. Optical Fiber Ribbon

Figure 2:
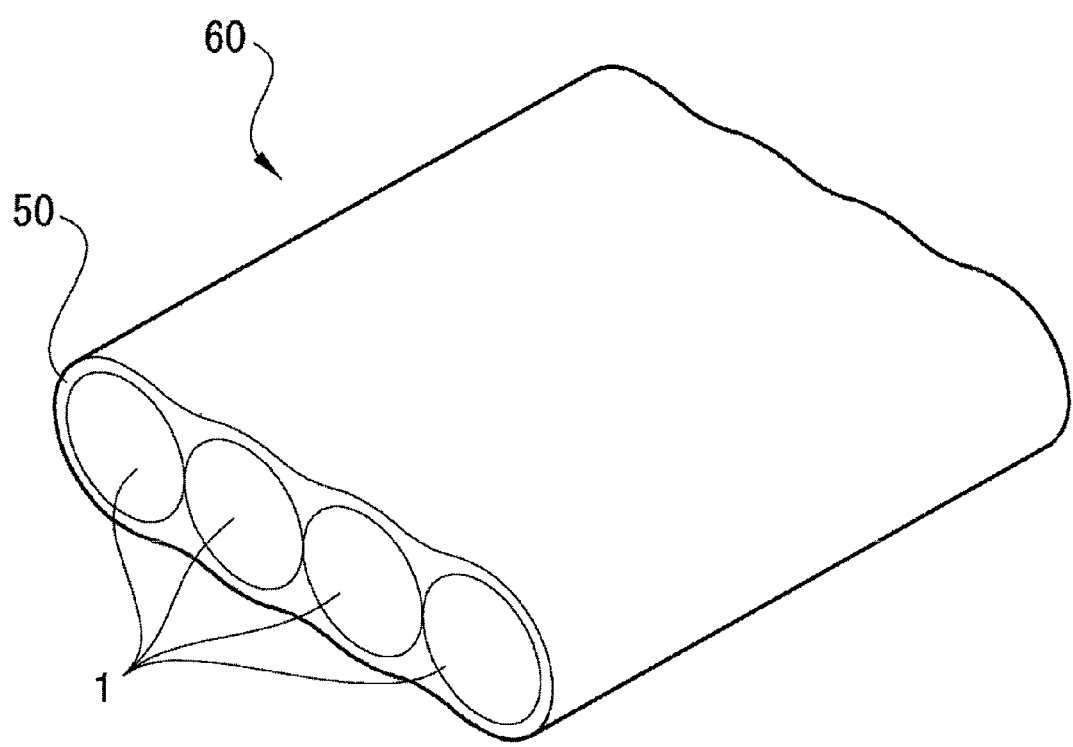
FIG. 2 is a schematic cross-sectional view showing one example of the optical fiber ribbon using the coated optical fiber of the invention.

The following will describe the optical fiber ribbon of the invention with reference to FIG. 2.

FIG. 2 is a schematic cross-sectional view showing one example of the optical fiber ribbon of the invention.

An optical fiber ribbon 60 has a structure that a plurality of the coated optical fibers 1 of the invention as described in the above are disposed in parallel and the periphery thereof is coated with a ribbon material 50 to integrate a plurality of the fibers.

It is preferred to bundle, for example, the 4 to 8 coated optical fibers in parallel per one optical fiber ribbon. A space between the coated optical fibers is preferably 10 μm or less.

EXAMPLES

The following will describe the present invention in further detail with showing results of evaluation tests using Examples according to the invention and Comparative Examples. The invention should not be construed as being limited to these Examples.

A coated optical fiber was prepared by forming an inner layer with a urethane-based ultraviolet curable resin composition 1 having the following composition on the outer circumference of a glass fiber having a clad layer composed of quartz glass provided on the outer circumference of a core layer composed of a quartz-based glass and further forming an outer layer with a urethane-based ultraviolet curable resin composition 2 having a composition different from that of the above resin composition 1 on the outer circumference thereof.

[Urethane-Based Ultraviolet Curable Resin Composition 1 (for Inner Layer Formation)]

| | |
|---|---|
| Urethane oligomer | 70 parts by weight |
| Reactive diluent | 30 parts by weight |
| Photo radical initiator | 1 part by weight |
| Surfactant | amount described in Table 1 below |
| Silane coupling agent | 2 parts by weight |

The four coated optical fibers prepared in the above was aligned in parallel and the periphery thereof was coated with a resin composition for ribbon material to integrate them, thereby preparing an optical fiber ribbon.

Using the optical fiber ribbon prepared in the above, evaluation on the attenuation change after water immersion and the ribbon simultaneous strippability was performed as follows. Table 1 shows Young's modulus of inner and outer coating resins in each of Examples and Comparative Example and evaluation results collectively.

(Evaluation Method of Attenuation Change after Water Immersion)

The optical fiber ribbon was immersed in water at 60° C. for 30 days and transmission loss at a wavelength of 1.55 μm before immersion and after immersion for 30 days was measured by OTDR method. Using measured loss level, the attenuation change after water immersion (Δα) was calculated according to the following equation.

$$\Delta\alpha(dB/km) = \text{loss (water at 60° C. for 30 days)} - \text{loss (before immersion)} \quad \text{Equation}$$

(Ribbon Strippability)

The ribbon material of the optical fiber ribbon and the coating resins (inner layer and outer layer) of the coated optical fiber were simultaneously removed with a non-heating type remover.

When a residue of the resins was not observed on the exposed glass fiber, the case was evaluated as passed and, when residue was observed, the case was evaluated as not passed.

TABLE 1

| | Example 1 | Example 2 | Comparative Example 1 |
|---|---|---|---|
| Surfactant (% by weight) | 0.1 | 1.0 | 0 |
| Young's modulus of inner layer (MPa) | 0.3 | 10 | 0.3 |
| Attenuation change after water immersion Δα (dB/km) | 0.05> | 0.01> | 0.05< |
| Ribbon strippability | passed | passed | not passed |

From the above results, it is confirmed that the optical fiber ribbons (Examples 1 and 2) having the inner layer formed of the urethane-based ultraviolet curable resin composition containing a defined amount of a surfactant are satisfactory in both of the attenuation change after water immersion and the ribbon strippability.

On the other hand, both of the attenuation change after water immersion and the ribbon strippability are inferior in Comparative example 1 in which no surfactant is contained in the inner layer, and exfoliation between glass and the inner layer resin are observed and the transmission loss are increased in Comparative Example 2 in which a surfactant is contained excessively (2% by weight).

What is claimed is:

1. A coated optical fiber comprising a glass fiber and a resin coating layer containing an inner layer and an outer layer provided on the outer circumference of the glass fiber,
   wherein the resin constituting the inner layer is formed by curing a urethane-based ultraviolet curable resin composition containing a fatty acid ester-type nonionic surfactant in an amount of 0.1 to 1.0% by weight and Young's modulus thereof is from 0.3 to 10 MPa.

2. The coated optical fiber according to claim 1, wherein an attenuation change at a wavelength of 1.55 μm after immersion in water at 60° C. for 30 days is less than 0.05 dB/km.

3. The coated optical fiber according to claim 1, wherein the urethane-based ultraviolet curable resin composition contains a urethane oligomer, a reactive diluent, and a photo radical initiator.

4. An optical fiber ribbon comprising:
   disposing a plurality of coated optical fibers in parallel and coating the periphery thereof with a ribbon material to integrate plurality of the coated optical fibers;
   each of a plurality of the coated optical fibers being a coated glass fiber comprising a glass fiber and a resin coating layer containing an inner layer and an outer layer provided on the outer circumference of the glass fiber,
   wherein the resin constituting the inner layer is formed by curing a urethane-based ultraviolet curable resin composition containing a fatty acid ester-type nonionic surfactant in an amount of 0.1 to 1.0% by weight and Young's modulus thereof is from 0.3 to 10 MPa.

5. The optical fiber ribbon according to claim 4, wherein, when the ribbon material of the optical fiber ribbon is stripped along with the resin coating layer of the coated optical fiber with a non-heating type remover, no resin residue remains on the exposed glass fiber.

6. The optical fiber ribbon according to claim 4, wherein, in each of the coated optical fibers, an attenuation change at a wavelength of 1.55 μm after immersion in water at 60° C. for 30 days is less than 0.05 dB/km.

7. The optical fiber ribbon according to claim 4, wherein, in each of a plurality of the coated optical fibers, the urethane-based ultraviolet curable resin composition contains a urethane oligomer, a reactive diluent, and a photo radical initiator.

8. The coated optical fiber according to claim 1, wherein the urethane-based ultraviolet curable resin composition contains a surfactant in an amount of not less than 0.1% by weight.

9. The coated optical fiber according to claim 8, wherein the urethane-based ultraviolet curable resin composition contains a surfactant in an amount of 0.1% by weight.

10. The optical fiber ribbon according to claim 4, wherein, in each of the coated optical fibers, the urethane-based ultraviolet curable resin composition contains a surfactant in an amount of not less than 0.1% by weight to less than 0.5% by weight.

11. The optical fiber ribbon according to claim 10, wherein, in each of the coated optical fibers, the urethane-based ultraviolet curable resin composition contains a surfactant in an amount of 0.1% by weight.

* * * * *